United States Patent
Lee et al.

(10) Patent No.: US 9,612,422 B2
(45) Date of Patent: Apr. 4, 2017

(54) PHOTOGRAPHING LENS SYSTEM

(71) Applicant: KOLEN CO., LTD., Seongnam-si (KR)

(72) Inventors: Jong Jin Lee, Seoul (KR); Chan Goo Kang, Seongnam-si (KR)

(73) Assignee: KOLEN CO., LTD. (KR)

( * ) Notice: Subject to any disclaimer, the term of this patent is extended or adjusted under 35 U.S.C. 154(b) by 0 days.

(21) Appl. No.: 14/840,813

(22) Filed: Aug. 31, 2015

(65) Prior Publication Data

US 2016/0161715 A1      Jun. 9, 2016

(30) Foreign Application Priority Data

Dec. 8, 2014   (KR) .......................... 10-2014-0175297

(51) Int. Cl.
*G02B 13/00* (2006.01)
*G02B 9/60* (2006.01)

(52) U.S. Cl.
CPC ................................ *G02B 13/0045* (2013.01)

(58) Field of Classification Search
CPC .............................. G02B 9/60; G02B 13/0045
USPC ............................ 396/75, 133, 529; 359/714
See application file for complete search history.

(56) References Cited

U.S. PATENT DOCUMENTS

| 2013/0201568 A1 | 8/2013 | Tsai et al. |
| 2014/0139935 A1 | 5/2014 | Hsieh et al. |
| 2016/0161720 A1* | 6/2016 | Son .......................... G02B 9/60 |
| | | 359/714 |

* cited by examiner

*Primary Examiner* — Rochelle-Ann J Blackman
(74) *Attorney, Agent, or Firm* — St. Onge Steward Johnston & Reens, LLC

(57) ABSTRACT

Provided is a photographing lens system that is cheap and has a small size. The photographing lens system includes a first lens having a positive refractive power, and including an object side surface that is convex toward the object side and an image side surface that is planar; a second lens having a negative refractive power, and including an object side surface that is convex toward the object side, and an image side surface that is plane; a third lens having a positive refractive power; a fourth lens having a negative refractive power; and a fifth lens having a negative refractive power, and including an image side surface that includes at least one inflection point.

14 Claims, 6 Drawing Sheets

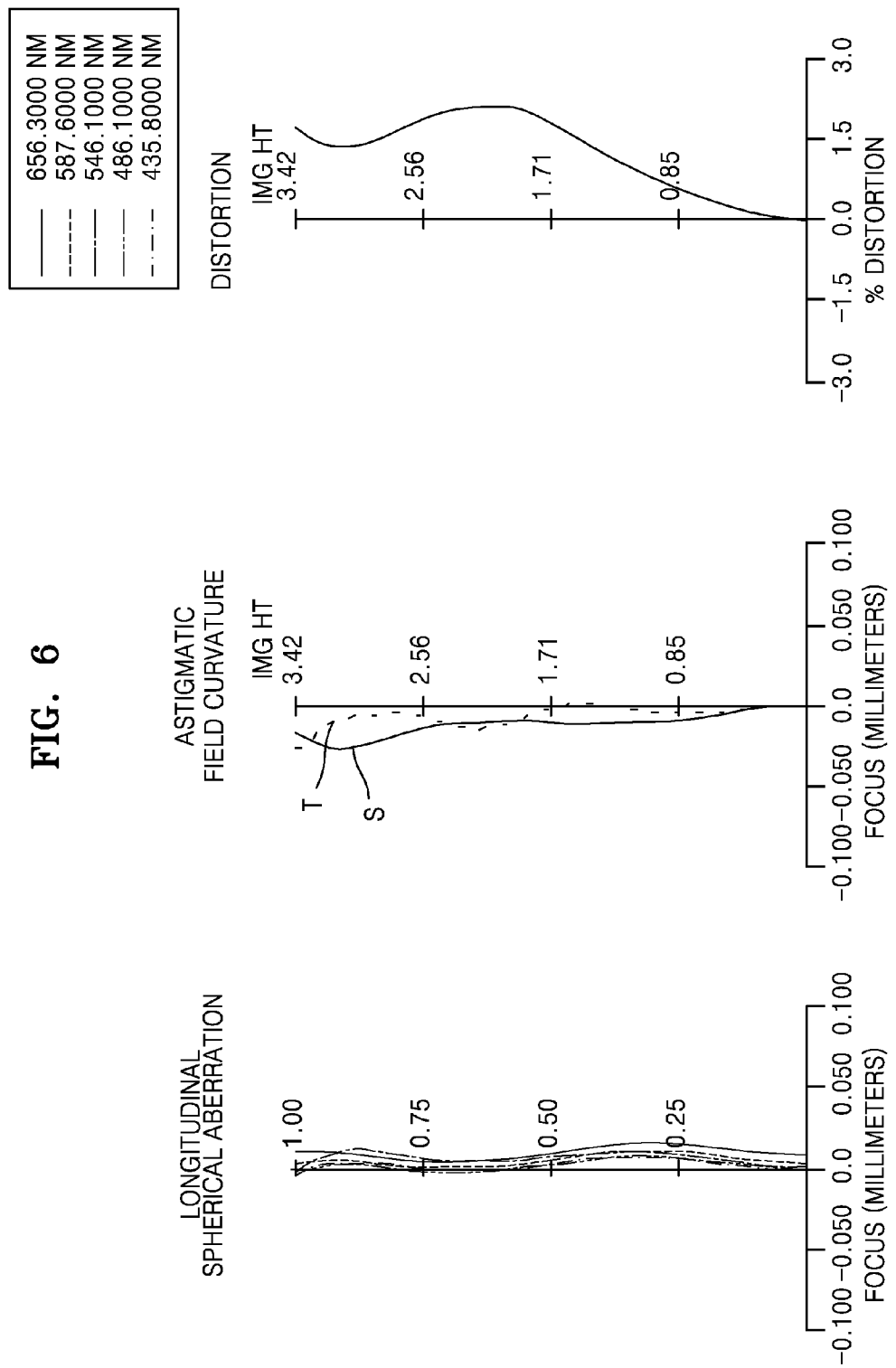

PHOTOGRAPHING LENS SYSTEM

FIELD OF THE INVENTION

One or more exemplary embodiments relate to a wide angle photographing lens system that is cheap and has a small size.

BACKGROUND OF THE INVENTION

In general, a camera is mounted in a mobile communication terminal, a laptop computer, and a vehicle in order to display peripheral image information or take pictures. Regarding an optical apparatus using a solid state imaging device such as a digital camera, an exchangeable lens system, or a video camera, users have demanded high resolution and high magnification. Also, as many mobile communication terminals, computers, or laptop computers are manufactured these days to have a small size, small, light, and high quality cameras are required. In addition, with regard to a vehicle camera, a small, light, and high quality camera is necessary in order not to block the driver's view and not to degrade the outer appearance of the vehicle. Also, such a camera has to have a wide viewing angle to obtain image information from a vast area.

Accordingly, along with attempts to manufacture a high quality camera by appropriately arranging a plurality of lenses, researches for increasing an optical viewing angle, reducing a focal distance to make a lens system with a small size, and at the same time, for achieving stable optical performance have been conducted.

SUMMARY OF THE INVENTION

One or more embodiments include a photographing lens system that is cheap and has a small size.

Additional aspects will be set forth in part in the description which follows and, in part, will be apparent from the description, or may be learned by practice of the presented embodiments.

According to one or more embodiments, a photographing lens system includes sequentially from an object side to an image plane side for forming an image on an image sensor: a first lens having a positive refractive power and including an object side surface that is convex toward the object side and an image side surface that is planar; a second lens having a negative refractive power and comprising an image side surface that is concave toward an image side; a third lens having a positive refractive power; a fourth lens having a negative refractive power; and a fifth lens having a negative refractive power and comprising an image side surface that includes at least one inflection point.

The photographing lens system may satisfy the following condition $$60 \text{ degrees} < FOV < 80 \text{ degrees},$$

where FOV denotes a viewing angle.

The photographing lens system may satisfy the following condition $$0.75 < AL/TTL < 1.0,$$

where AL denotes a distance from an aperture stop to the image sensor, and TTL denotes a total length of the photographing lens system.

The photographing lens system may satisfy the following condition $$0.7 < TTL/\text{Img}H < 1.0,$$

where ImgH denotes a diagonal length of an effective pixel area of the image sensor and TTL denotes a total length of the photographing lens system.

The photographing lens system may satisfy the following condition $$50 < (V3+V4)/2 < 60,$$

where V3 denotes an Abbe's number of the third lens, and V4 denotes an Abbe's number of the fourth lens.

The photographing lens system may satisfy the following condition $$0.6 < TTL/(\text{Img}H*BFL) < 1.5,$$

where BFL denotes a back focal length of the photographing lens system, ImgH denotes a diagonal length of an effective pixel area of the image sensor and TTL denotes a total length of the photographing lens system.

The photographing lens system may satisfy the following condition $$1.3 < \text{Ind4} < 1.7,$$

where Ind4 denotes a refractive index of the fourth lens.

The photographing lens system may satisfy the following condition $$30 < CRA7 < 40,$$

where CRA7 denotes a chief ray angle at 0.7 F of the image sensor.

The photographing lens system may satisfy the following condition $$0.5 < (R3+R4)/(R3-R4) < 1.5,$$

where R3 denotes a radius of curvature of the object side surface of the second lens, and R4 denotes a radius of curvature of the image side surface of the second lens.

The third lens may be convex toward the image side.

The fourth lens may be convex toward the image side

An object side surface of the fifth lens may include at least one inflection point.

An aperture stop may be disposed at the object side of the first lens.

The third lens and the fourth lens may be meniscus lenses.

Each of the first lens, the second lens, the third lens, the fourth lens, and the fifth lens may be aspherical lenses.

BRIEF DESCRIPTION OF THE DRAWINGS

These and/or other aspects will become apparent and more readily appreciated from the following description of the embodiments, taken in conjunction with the accompanying drawings in which:

FIG. 6 is an aberration diagram of the optical lens system of FIG. 5.

DETAILED DESCRIPTION OF THE INVENTION

Figure 1:
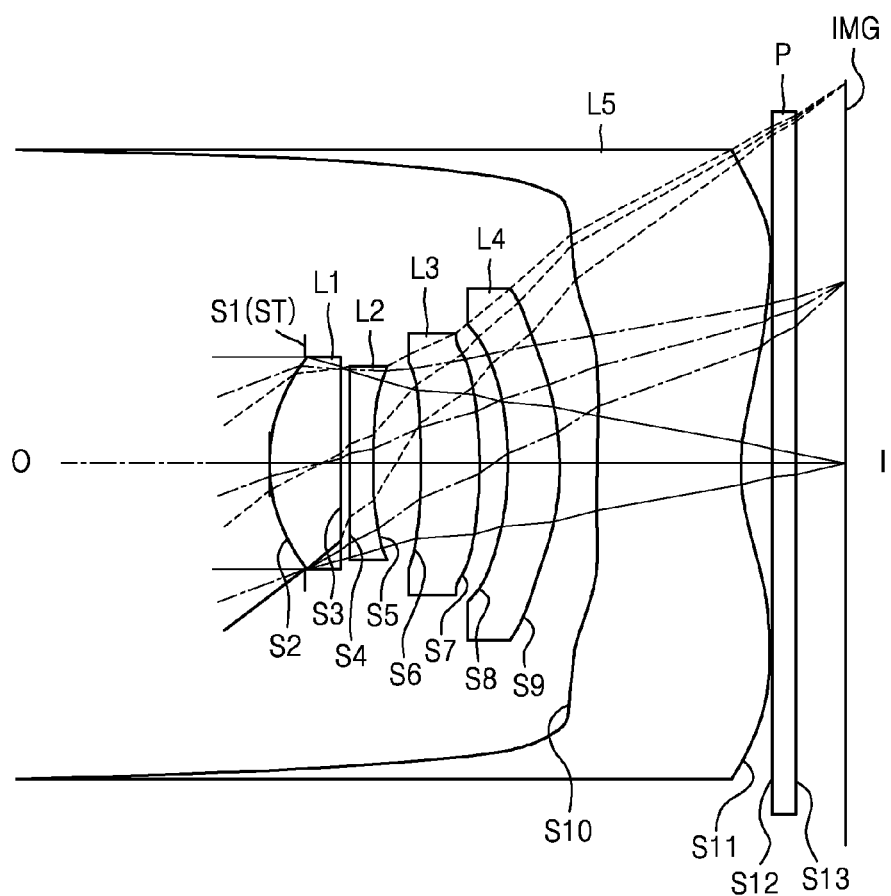
FIG. 1 is a diagram showing an optical lens system according to an embodiment of the inventive concept.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, the inventive concept will be described in detail by explaining preferred embodiments of the invention with reference to the attached drawings.

FIG. 1 is a diagram showing an optical lens system according to an embodiment of the present invention.

The optical lens system may include at least one lens for forming an image on an image sensor. The optical lens system may include a first lens L1 having a positive refractive power, a second lens L2 having a negative refractive power, a third lens L3 having a positive refractive power, a fourth lens L4 having a negative refractive power, and a fifth lens L5 having a negative refractive power that are sequentially arranged from an object side O to an image side I. For example, the first lens L1 may have a strong positive refractive power and the second and fourth lenses L2 and L4 may have the negative refractive power so that the positive refractive power of the first lens L1 may be appropriately distributed and aberration may be corrected. However, one or more embodiments of the inventive concept are not limited thereto.

The first lens L1 may have a flat surface. For example, an image side surface of the first lens L1 may be plane. An object side surface of the first lens L1 may be convex toward the object side O. The second lens L2 may have an image side surface that is concave toward the image side I. For example, the second lens L2 may be a biconcave lens. The third lens L3 may have an object side lens that is concave toward the object side O. For example, the third lens L3 may be a meniscus lens.

The fourth lens L4 may have an object side lens that is concave toward the object side O. For example, the fourth lens L4 may be a meniscus lens.

The fifth lens L5 may have an image side surface that is concave toward the image side I around an optical axis. The image side surface of the fifth lens L5 may have at least an inflection point. The inflection point may denote a point where a sign of a radius of curvature changes from positive (+) to negative (−) or from negative (−) to positive (+). Otherwise, the inflection point may denote a point where the shape of the lens changes from a convex shape to a concave shape or from a concave shape to a convex shape. The image side surface of the fifth lens L5 may be concave around the optical axis (within a predetermined radius from the optical axis), and may be convex away from the optical axis. Otherwise, the object side surface of the fifth lens L5 may be convex around the optical axis, may become concave away from the optical axis, and then, may be changed to be convex again. At least one of the object side surface and the image side surface of the fifth lens L5 may have the inflection point, and may be formed as an aspheric surface to correct the aberration.

An image of a subject may be incident to an image plane IMG through the first lens, the second lens, the third lens, the fourth lens, and the fifth lens. The image plane IMG may be a surface of an image pickup device or a surface of an image sensor.

At least one optical filter P may be disposed between the fifth lens L5 and the image plane IMG. The optical filter P may include, for example, at least one selected from a low pass filter, an infrared ray (IR)-cut filter, and a cover glass. For example, if an IR-cut filter is used as the optical filter, the optical filter may transmit a visible ray and reflects an IR to outside so that the IR may not be transferred to the image plane IMG. However, the photographing lens may be configured without using the optical filter.

In addition, the photographing lens system may include an aperture stop ST. For example, the aperture stop ST may be disposed at the object side O of the first lens L1. However, one or more embodiments of the inventive concept are not limited thereto, that is, the aperture stop ST may be disposed between the first lens L1 and the second lens L2.

Each of the first lens L1, the second lens L2, the third lens L3, the fourth lens L4, and the fifth lens L5 may have at least one aspherical surface. For example, each of the first lens L1, the second lens L2, the third lens L3, the fourth lens L4, and the fifth lens L5 may be a bi-aspherical lens. As such, the photographing lens system that is compact and has high resolution may be manufactured. Also, at least one selected from the first to fifth lenses L1 to L5 may be formed of a plastic material to reduce manufacturing costs and to easily manufacture the aspherical surface. For example, each of the first to fifth lenses L1 to L5 may be a plastic lens.

The photographic lens system according to the embodiment of the inventive concept may satisfy the following condition.

$$60 < FOV < 80 \qquad (1)$$

Here, FOV denotes a viewing angle.

The photographic lens system according to the embodiment of the inventive concept may satisfy the following condition.

$$0.75 < AL/TTL < 1.0 \qquad (2)$$

Here, AL denotes a distance from the aperture stop ST to the image sensor, and TTL denotes a total length of the photographing lens system. TTL may be a distance from a vertex of the object side surface of the first lens L1 to the surface of the image surface (image plane IMG). The condition (2) defines a location of the aperture stop ST. The aperture stop ST may be disposed at the object side surface of the first lens L1 or between the first lens L1 and the second lens L2.

The photographing lens system according to the embodiment of the inventive concept may satisfy the following condition.

$$0.7 < TTL/ImgH < 1.0 \qquad (3)$$

Here, ImgH denotes a diagonal length of an effective pixel area of the image sensor.

The above condition (3) expresses a ratio between the diagonal length of the effective pixel area in the image sensor and the total length of the photographing lens system. When a value of TTL/ImgH satisfies the condition (3), the photographing lens system may be slim and easily correct the aberration. If the value of TTL/ImgH is equal to or less than the lowest limit, the photographing lens system may be slim, but it may be difficult to correct the aberration. If the value of TTL/ImgH is equal to or greater than the highest limit, the aberration of the photographing lens system may be easily corrected, but the photographing lens system becomes thick.

The photographing lens system according to the embodiment of the inventive concept may satisfy the following condition.

$$50<(V3+V4)/2<60 \quad (4)$$

Here, V3 denotes an Abbe's number of the third lens L3, and V4 denotes an Abbe's number of the fourth lens L4.

The condition (4) defines the Abbe's number of the third lens L3 and the fourth lens L4. Plastic lenses are used to reduce manufacturing costs and to form a compact photographing lens system.

The photographing lens system according to the embodiment of the inventive concept may satisfy the following condition.

$$0.6<(TTL/(ImgH \times BFL)<1.5 \quad (5)$$

Here, BFL denotes a back focal length of the photographing lens system. That is, BFL denotes a distance from a vertex of the image side surface of the fifth lens to the image sensor.

When the photographing lens system satisfies the condition (5), the photographing lens system may be manufactured easily and the aberration may be corrected effectively.

The photographing lens system according to the embodiment of the inventive concept may satisfy the following condition.

$$1.3<Ind4<1.7 \quad (6)$$

Here, Ind4 denotes a refractive index of the fourth lens L4. The fourth lens L4 is formed of a material having a low refractive index satisfying the condition (6), and accordingly, manufacturing costs may be reduced.

The photographing lens system according to the embodiment of the inventive concept may satisfy the following condition.

$$30<CRA7<40 \quad (7)$$

Here, CRA7 denotes a chief ray angle of the image sensor at 0.7 F. F denotes a field, and CRA7 denotes an angle formed by a chief ray incident to a location corresponding to 7/10 of the diagonal line of the image sensor and the optical axis. When the angle of the principal ray satisfies the condition (7), the optical performance of the lens system may be improved.

The photographing lens system according to the embodiment of the inventive concept may satisfy the following condition.

$$0.5<(R3+R4)/(R3-R4)<1.5 \quad (8)$$

Here, R3 denotes a radius of curvature of the object side surface of the second lens L2, and R4 denotes a radius of curvature of the image side surface of the second lens L1.

The condition (8) denotes a ratio between the radius of curvature of the object side surface and the radius of curvature of the image side surface of the second lens L2. When a value of [(R3+R4)/(R3−R4)] satisfies the condition (8), a sensitivity of the second lens L2 may be appropriately adjusted and a coma aberration may be easily corrected.

Next, the aspherical surface of the photographing lens system according to the embodiment of the inventive concept may be defined as follows.

The aspherical surface shape of the optical lens system according to the present embodiment may be defined by following equation, when it is assumed that an optical axis direction is a z-axis, a direction perpendicular to the optical axis direction is y-axis, and a proceeding direction of a light ray is positive direction. Here, Z denotes a distance from a vertex of the lens along the optical axis, Y denotes a distance in a direction perpendicular to the optical axis, K denotes a conic constant, A, B, C, D, E, F. denote aspherical coefficients, and c denotes a reciprocal number of the radius of curvature (1/R) at the vertex of the lens.

$$Z = \frac{cY^2}{1+\sqrt{1-(1+K)c^2Y^2}} + AY^4 + BY^6 + CY^8 + DY^{10} + EY^{12} + FY^{14} + \quad (9)$$

The photographing lens system may be realized through following embodiments according to various designs. Hereinafter, f denotes the focal length expressed in units of mm, FOV is expressed in units of degree, and * denotes an aspherical surface. R denotes a radius of curvature of the lens surface, T denotes a lens thickness or a distance between lenses, Nd denotes a refractive index, Vd denotes an Abbe's number, and FNo denotes an F number.

In the drawings showing the embodiments, at least one filter P may be disposed at the image side I. The filter P may include, for example, at least one selected from the low pass filter, the IR-cut filter, and the cover glass. However, the photographing lens system may be configured without using the filter. An image of a subject may be incident to the image plane IMG through the lenses. The image plane IMG may be, for example, an image of the image pickup device or an image of the image sensor.

In tables of the embodiments, the lens surfaces (S1, S2, S3 . . . Sn; n is a natural number) are numbered sequentially from the object side O to the image side I.

First Embodiment

FIG. 1 shows a photographing lens system according to the first embodiment, and the lens data of the first embodiment is as follows.

FNo=2.30, f=4.5542 mm

TABLE 1

| Lens surface | R | T | Nd | Vd |
|---|---|---|---|---|
| Object | Infinity | 0.3257 | | |
| S1(ST) | Infinity | −0.3257 | | |
| S2* | 1.5994 | 0.6707 | 1.5465 | 56.093 |
| S3* | Infinity | 0.0800 | | |
| S4* | −26.4725 | 0.2200 | 1.6483 | 22.434 |
| S5* | 4.2325 | 0.4495 | | |
| S6* | −34.1499 | 0.5468 | 1.5465 | 56.093 |
| S7* | −6.8385 | 0.2813 | | |
| S8* | −2.4986 | 0.4846 | 1.5465 | 56.093 |
| S9* | −2.6945 | 0.3507 | | |
| S10* | 5.1061 | 1.3677 | 1.5340 | 55.856 |
| S11* | 2.1012 | 0.3000 | | |
| S12 | Infinity | 0.2100 | 1.5297 | 39.068 |
| S13 | Infinity | 0.4691 | | |
| IMG | Infinity | −0.0039 | | |

Aspherical coefficients of the photographing lens system according to the first embodiment are as follows.

TABLE 2

| Lens surface | K | A | B | C | D | E | F | G | H | J |
|---|---|---|---|---|---|---|---|---|---|---|
| S2 | −0.0465 | 0.0048 | 0.0225 | −0.0455 | 0.0482 | −0.0221 | — | — | — | — |
| S3 | — | — | — | — | — | — | — | — | — | — |
| S4 | 0.0000 | −0.0176 | 0.0589 | −0.0373 | 0.0397 | −0.0072 | — | — | — | — |
| S5 | 0.2717 | −0.0163 | 0.0845 | −0.0306 | 0.0053 | 0.0516 | — | — | — | — |
| S6 | 0.0000 | −0.1059 | −0.0144 | −0.0159 | 0.0041 | 0.0313 | — | — | — | — |
| S7 | 0.0000 | −0.0317 | −0.0741 | 0.0298 | 0.0012 | 0.0047 | — | — | — | — |
| S8 | −19.0591 | −0.0482 | 0.0024 | −0.0227 | 0.0103 | 0.0004 | 0.0036 | −0.0026 | — | — |
| S9 | −0.4489 | −0.0087 | 0.0020 | 0.0113 | −0.0043 | −0.0001 | 0.0004 | −0.0001 | — | — |
| S10 | −44.0324 | −0.1042 | 0.0255 | −0.0008 | −0.0002 | −0.0000 | 0.0000 | 0.0000 | −0.0000 | — |
| S11 | −4.5982 | −0.0466 | 0.0132 | −0.0027 | 0.0003 | 0.0000 | −0.0000 | −0.0000 | 0.0000 | −0.0000 |

Figure 2:
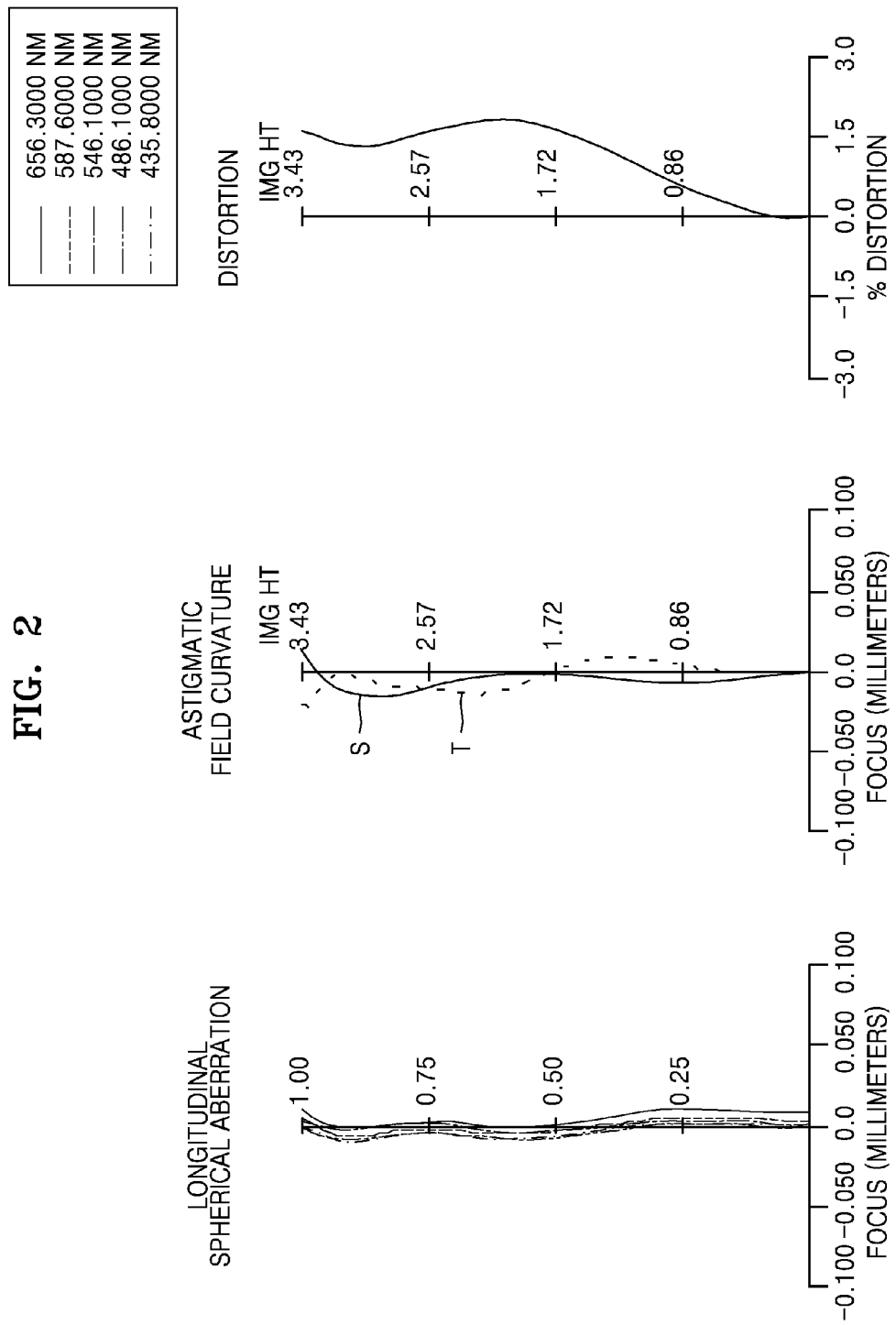
FIG. 2 is an aberration diagram of the optical lens system of FIG. 1.

FIG. 2 shows a longitudinal spherical aberration, an astigmatic field curves, and a distortion of the photographing lens system according to the first embodiment of the inventive concept. As the astigmatic field curvature, a tangential field curvature (T) and a sagittal field curvature (S) are shown.

Second Embodiment

Figure 3:
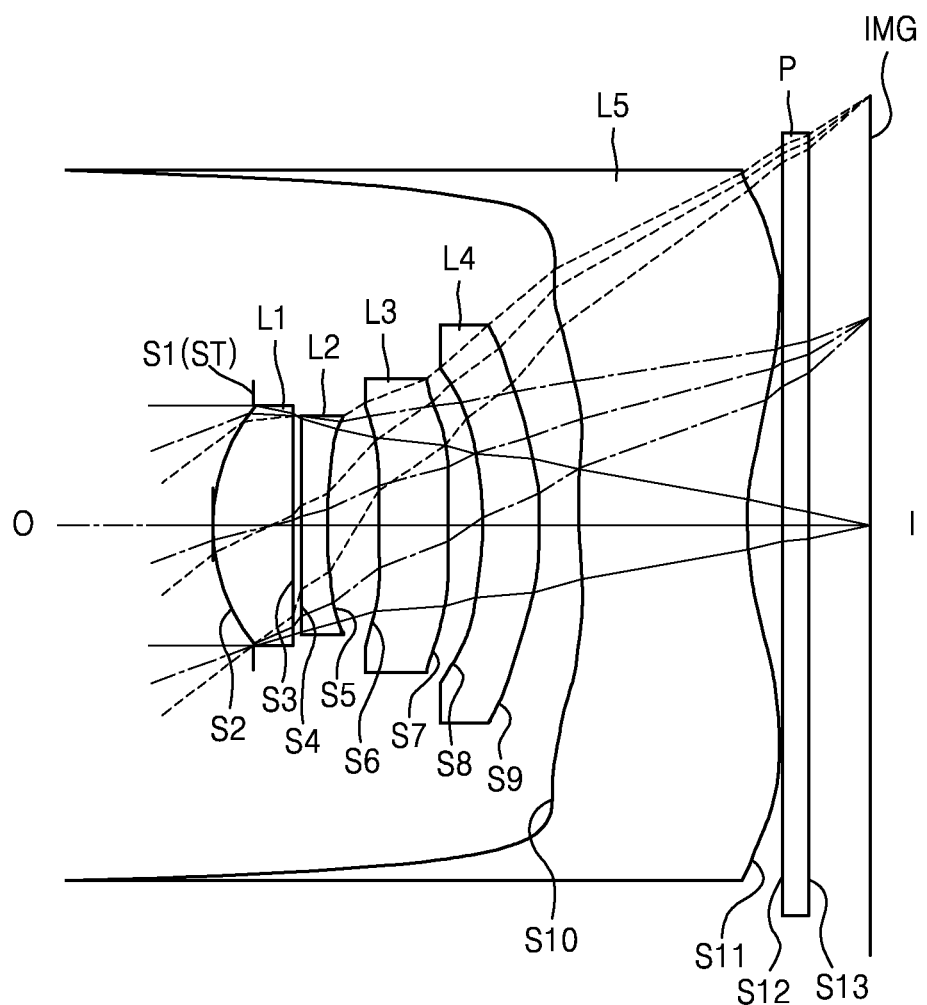
FIG. 3 is a diagram showing an optical lens system according to another embodiment of the inventive concept.

FIG. 3 shows a photographing lens system according to the second embodiment, and the lens data of the second embodiment is as follows.

FNo.=2.30/f=4.5785 mm

TABLE 3

| Lens surface | R | T | Nd | Vd |
|---|---|---|---|---|
| Object | Infinity | 0.3293 | | |
| S1(ST) | Infinity | −0.3293 | | |
| S2* | 1.6012 | 0.6544 | 1.5465 | 56.093 |
| S3* | Infinity | 0.0800 | | |
| S4* | −20.8497 | 0.2107 | 1.6483 | 22.434 |
| S5* | 4.5654 | 0.4354 | | |
| S6* | −24.7622 | 0.5811 | 1.5465 | 56.093 |
| S7* | −7.5255 | 0.2771 | | |
| S8* | −2.6544 | 0.4768 | 1.5465 | 56.093 |
| S9* | −2.8239 | 0.3277 | | |
| S10* | 4.9138 | 1.4003 | 1.5340 | 55.856 |
| S11* | 2.1951 | 0.3000 | | |
| S12 | Infinity | 0.2100 | 1.5297 | 39.068 |
| S13 | Infinity | 0.5217 | | |
| IMG | Infinity | −0.0005 | | |

Aspherical coefficients of the photographing lens system according to the second embodiment are as follows.

TABLE 4

| Lens surface | K | A | B | C | D | E | F | G | H | J |
|---|---|---|---|---|---|---|---|---|---|---|
| S2 | −0.0429 | 0.0041 | 0.0244 | −0.0459 | 0.0469 | −0.0218 | — | — | — | — |
| S3 | — | — | — | — | — | — | — | — | — | — |
| S4 | 0.0000 | −0.0141 | 0.0614 | −0.0386 | 0.0387 | −0.0045 | — | — | — | — |
| S5 | 1.7667 | −0.0137 | 0.0833 | −0.0306 | 0.0052 | 0.0557 | — | — | — | — |
| S6 | 0.0000 | −0.1008 | −0.0133 | −0.0136 | 0.0060 | 0.0314 | — | — | — | — |
| S7 | 0.0000 | −0.0254 | −0.0718 | 0.0288 | 0.0008 | 0.0052 | — | — | — | — |
| S8 | −22.9830 | −0.0424 | 0.0021 | −0.0232 | 0.0100 | 0.0002 | 0.0037 | −0.0023 | — | — |
| S9 | −0.4378 | −0.0097 | 0.0031 | 0.0116 | −0.0043 | −0.0001 | 0.0004 | −0.0001 | — | — |
| S10 | −41.3365 | −0.1015 | 0.0254 | −0.0008 | −0.0002 | −0.0000 | 0.0000 | 0.0000 | −0.0000 | — |
| S11 | −4.2357 | −0.0480 | 0.0136 | −0.0027 | 0.0003 | 0.0000 | −0.0000 | −0.0000 | 0.0000 | −0.0000 |

Figure 4:
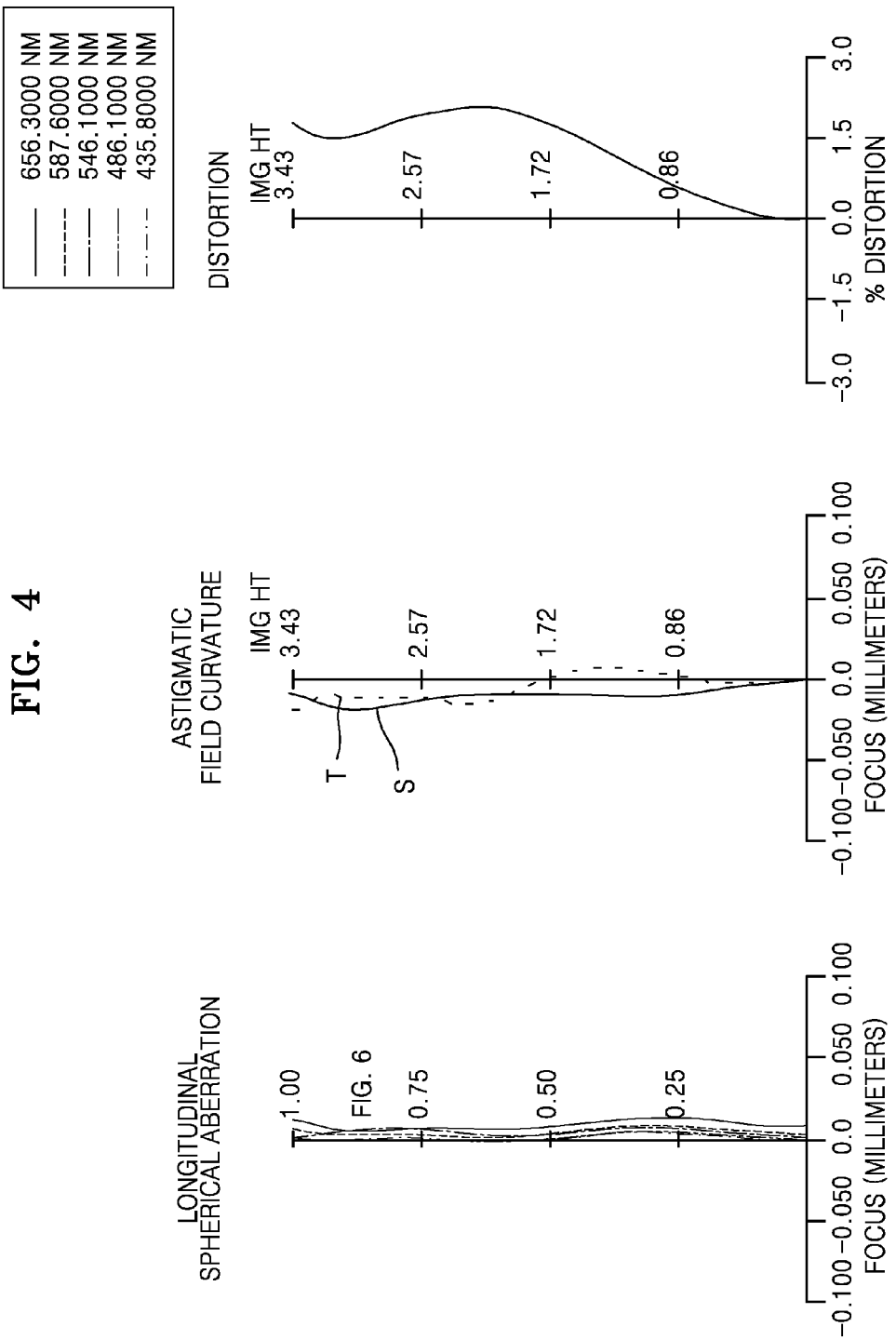
FIG. 4 is an aberration diagram of the optical lens system of FIG. 3.

FIG. 4 shows a longitudinal spherical aberration, an astigmatic field curves, and a distortion of the photographing lens system according to the second embodiment of the inventive concept.

Third Embodiment

Figure 5:
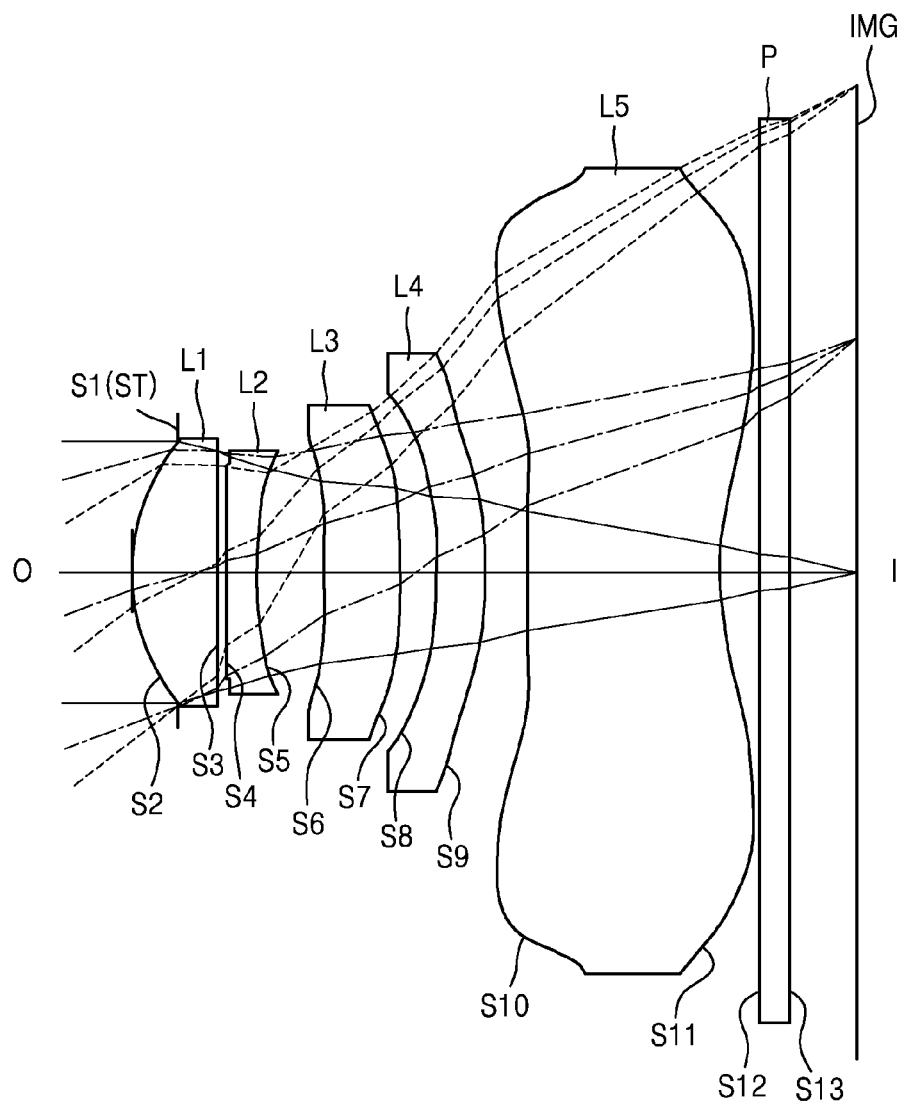
FIG. 5 is a diagram showing an optical lens system according to another embodiment of the inventive concept.

FIG. 5 shows a photographing lens system according to the third embodiment, and the lens data of the third embodiment is as follows.

FNo.=2.30/f=4.5115 mm

TABLE 5

| Lens surface | R | T | Nd | Vd |
|---|---|---|---|---|
| Object | Infinity | 0.3229 | | |
| S1(ST) | Infinity | −0.3229 | | |
| S2* | 1.5471 | 0.6155 | 1.5465 | 56.093 |
| S3* | Infinity | 0.0797 | | |
| S4* | −46.7371 | 0.2100 | 1.6483 | 22.434 |
| S5* | 3.9590 | 0.4965 | | |
| S6* | −17.8422 | 0.5506 | 1.5465 | 56.093 |
| S7* | −7.6569 | 0.2828 | | |
| S8* | −2.4441 | 0.3500 | 1.5465 | 56.093 |
| S9* | −2.6880 | 0.3036 | | |
| S10* | 4.6776 | 1.4168 | 1.5340 | 55.856 |
| S11* | 2.2007 | 0.2989 | | |
| S12 | Infinity | 0.2100 | 1.5297 | 39.068 |
| S13 | Infinity | 0.4862 | | |
| IMG | Infinity | −0.0004 | | |

Aspherical coefficients of the photographing lens system according to the second embodiment are as follows.

TABLE 6

| Lens surface | K | A | B | C | D | E | F | G | H | J |
|---|---|---|---|---|---|---|---|---|---|---|
| S2 | −0.0620 | 0.0046 | 0.0232 | −0.0456 | 0.0467 | −0.0243 | — | — | — | — |
| S3 | — | — | — | — | — | — | — | — | — | — |
| S4 | 0.0000 | −0.0072 | 0.0661 | −0.0418 | 0.0401 | −0.0007 | — | — | — | — |
| S5 | 6.0472 | −0.0025 | 0.0793 | −0.0183 | 0.0065 | 0.0608 | — | — | — | — |
| S6 | 0.0000 | −0.1004 | −0.0097 | −0.0105 | −0.0032 | 0.0371 | — | — | — | — |
| S7 | 0.0000 | −0.0379 | −0.0677 | 0.0249 | −0.0014 | 0.0074 | — | — | — | — |
| S8 | −21.0342 | −0.0330 | −0.0045 | −0.0221 | 0.0105 | −0.0006 | 0.0036 | −0.0022 | — | — |
| S9 | −1.5209 | −0.0043 | 0.0050 | 0.0109 | −0.0047 | −0.0002 | 0.0004 | −0.0001 | — | — |
| S10 | −61.3973 | −0.1020 | 0.0260 | −0.0008 | −0.0002 | −0.0000 | 0.0000 | 0.0000 | −0.0000 | — |
| S11 | −5.3368 | −0.0451 | 0.0131 | −0.0028 | 0.0003 | 0.0000 | −0.0000 | −0.0000 | 0.0000 | −0.0000 |

FIG. 6 shows a longitudinal spherical aberration, an astigmatic field curves, and a distortion of the photographing lens system according to the third embodiment of the inventive concept.

The photographing lens system according to the embodiments of the inventive concept includes five lenses. In addition, the refractive power is appropriately distributed to each of the lenses to reduce the aberration, and the total length of the photographing lens system is reduced to form a compact optical system. Also, the photographing lenses have simplified lens surfaces so as to be manufactured easily.

Following table shows that the first to third embodiments of the inventive concept satisfy the above conditions (1) to (8).

TABLE 7

| | First embodiment | second embodiment | third embodiment |
|---|---|---|---|
| FOV | 73.11 | 72.68 | 73.33 |
| Condition (1) | 73.11 | 72.68 | 73.33 |
| AL | 5.1 | 5.15 | 4.98 |
| TTL | 5.43 | 5.47 | 5.3 |
| Condition (2) | 0.94 | 0.94 | 0.94 |
| IMGH | 6.86 | 6.86 | 6.83 |
| Condition (3) | 0.79 | 0.8 | 0.78 |
| V3 | 56.09 | 56.09 | 56.09 |
| V4 | 56.09 | 56.09 | 56.09 |
| Condition (4) | 56.09 | 56.09 | 56.09 |
| BFL | 0.98 | 1.03 | 0.99 |
| Condition (5) | 0.81 | 0.77 | 0.78 |
| Ind4 | 1.546 | 1.546 | 1.546 |
| Condition (6) | 1.546 | 1.546 | 1.546 |
| CRA7 | 33.56 | 34.17 | 33 |
| Condition (7) | 33.56 | 34.17 | 33 |
| R3 | −26.47 | −20.85 | −46.74 |
| R4 | 4.23 | 4.57 | 3.96 |
| Condition (8) | 0.72 | 0.64 | 0.84 |

The photographing lens system according to the one or more embodiments of the inventive concept includes five lenses and distributes the refractive power appropriately to each of the lenses so as to reduce aberration and reduce the total length of the photographing lens system to realize a compact optical system. Also, the lens surfaces of the photographing lens system are simplified to be manufactured easily.

The photographing lens system may be adopted as an image pickup device or an image sensor such as a CMOS or CCD, a digital camera including at least one lens, an exchangeable lens camera, a video camera, a surveillance camera, a mobile communication device, and a camera for vehicles.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A photographing lens system comprising sequentially from an object side to an image plane side for forming an image on an image sensor:
   a first lens having a positive refractive power and comprising an object side surface that is convex toward the object side and an image side surface that is planar;
   a second lens having a negative refractive power and comprising an image side surface that is concave toward an image side;
   a third lens having a positive refractive power;
   a fourth lens having a negative refractive power; and
   a fifth lens having a negative refractive power and comprising an image side surface that includes at least one inflection point; and
   wherein the photographing lens system satisfies the following condition $$50 < (V3 + V4)/2 < 60,$$

where V3 denotes an Abbe's number of the third lens, and V4 denotes an Abbe's number of the fourth lens.

2. The photographing lens system of claim 1, wherein the photographing lens system satisfies the following condition $$60 \text{ degrees} < FOV < 80 \text{ degrees},$$

where FOV denotes a viewing angle.

3. The photographing lens system of claim 1, wherein the photographing lens system satisfies the following condition $$0.75 < AL/TTL < 1.0,$$

where AL denotes a distance from an aperture stop to the image sensor, and TTL denotes a total length of the photographing lens system.

4. The photographing lens system of claim 1, wherein the photographing lens system satisfies the following condition $$0.7 < TTL/ImgH < 1.0,$$

where ImgH denotes a diagonal length of an effective pixel area of the image sensor and TTL denotes a total length of the photographing lens system.

5. The photographing lens system of claim 1, wherein the photographing lens system satisfies the following condition $0.6<TTL/(ImgH*BFL)<1.5$, where BFL denotes a back focal length of the photographing lens system, ImgH denotes a diagonal length of an effective pixel area of the image sensor and TTL denotes a total length of the photographing lens system.

6. The photographing lens system of claim 1, wherein the photographing lens system satisfies the following condition $1.3<Ind4<1.7$, where Ind4 denotes a refractive index of the fourth lens.

7. The photographing lens system of claim 1, wherein the third lens is convex toward the image side.

8. The photographing lens system of claim 1, wherein the fourth lens is convex toward the image side.

9. The photographing lens system of claim 1, wherein an object side surface of the fifth lens comprises at least one inflection point.

10. The photographing lens system of claim 1, wherein an aperture stop is disposed at the object side of the first lens.

11. A photographing lens system comprising sequentially from an object side to an image plane side for forming an image on an image sensor:
   a first lens having a positive refractive power and comprising an object side surface that is convex toward the object side and an image side surface that is planar;
   a second lens having a negative refractive power and comprising an image side surface that is concave toward an image side;
   a third lens having a positive refractive power;
   a fourth lens having a negative refractive power; and
   a fifth lens having a negative refractive power and comprising an image side surface that includes at least one inflection point, and
   wherein the photographing lens system satisfies the following condition $30<CRA7<40$, where CRA7 denotes a chief ray angle at 0.7 F of the image sensor.

12. A photographing lens system comprising sequentially from an object side to an image plane side for forming an image on an image sensor:
   a first lens having a positive refractive power and comprising an object side surface that is convex toward the object side and an image side surface that is planar;
   a second lens having a negative refractive power and comprising an image side surface that is concave toward an image side;
   a third lens having a positive refractive power;
   a fourth lens having a negative refractive power; and
   a fifth lens having a negative refractive power and comprising an image side surface that includes at least one inflection point, and
   wherein the photographing lens system satisfies the following condition $0.5<(R3+R4)/(R3-R4)<1.5$, where R3 denotes a radius of curvature of the object side surface of the second lens, and R4 denotes a radius of curvature of the image side surface of the second lens.

13. A photographing lens system comprising sequentially from an object side to an image plane side for forming an image on an image sensor:
   a first lens having a positive refractive power and comprising an object side surface that is convex toward the object side and an image side surface that is planar;
   a second lens having a negative refractive power and comprising an image side surface that is concave toward an image side;
   a third lens having a positive refractive power;
   a fourth lens having a negative refractive power; and
   a fifth lens having a negative refractive power and comprising an image side surface that includes at least one inflection point, and
   wherein the third lens and the fourth lens are meniscus lenses.

14. The photographing lens system of claim 1, wherein each of the first lens, the second lens, the third lens, the fourth lens, and the fifth lens are aspherical lenses.

* * * * *